Patented Sept. 16, 1930

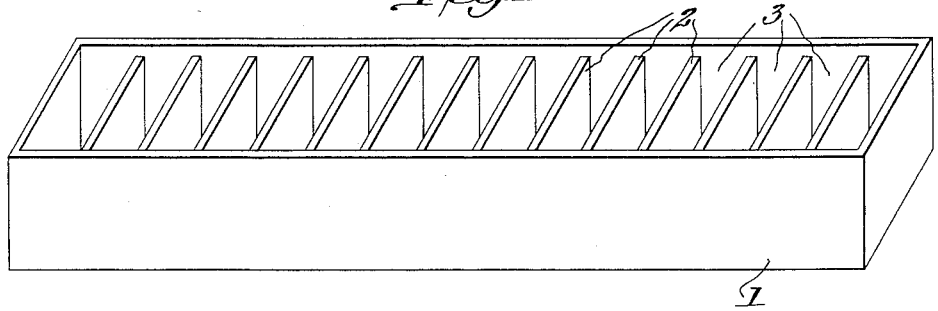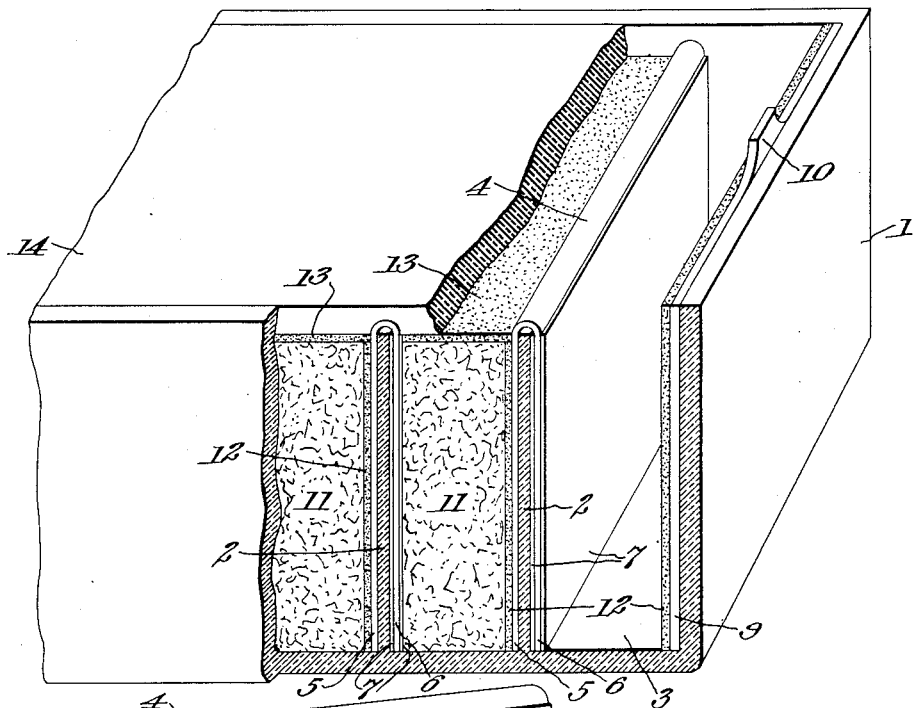

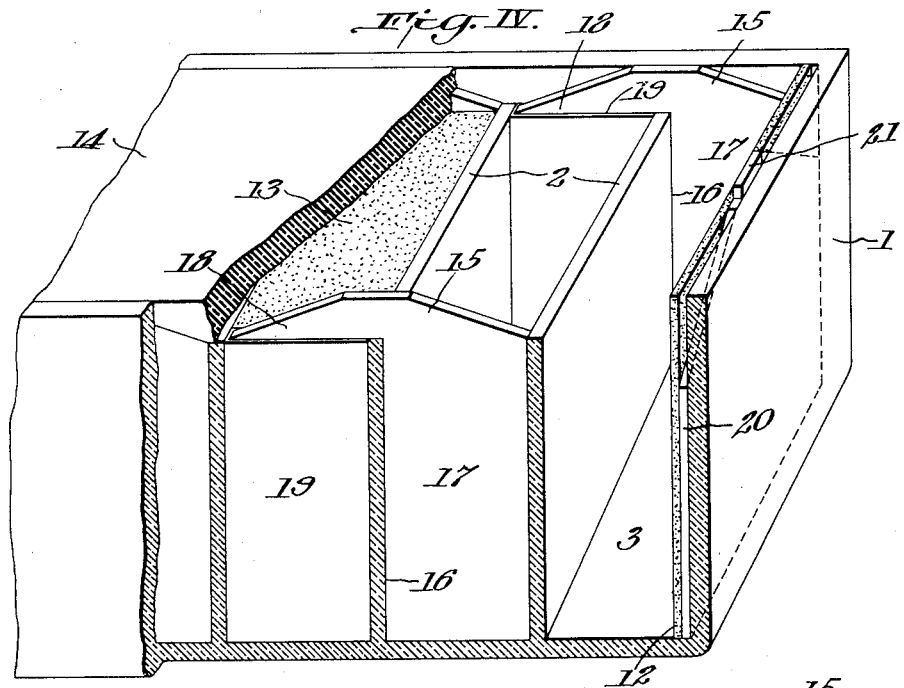
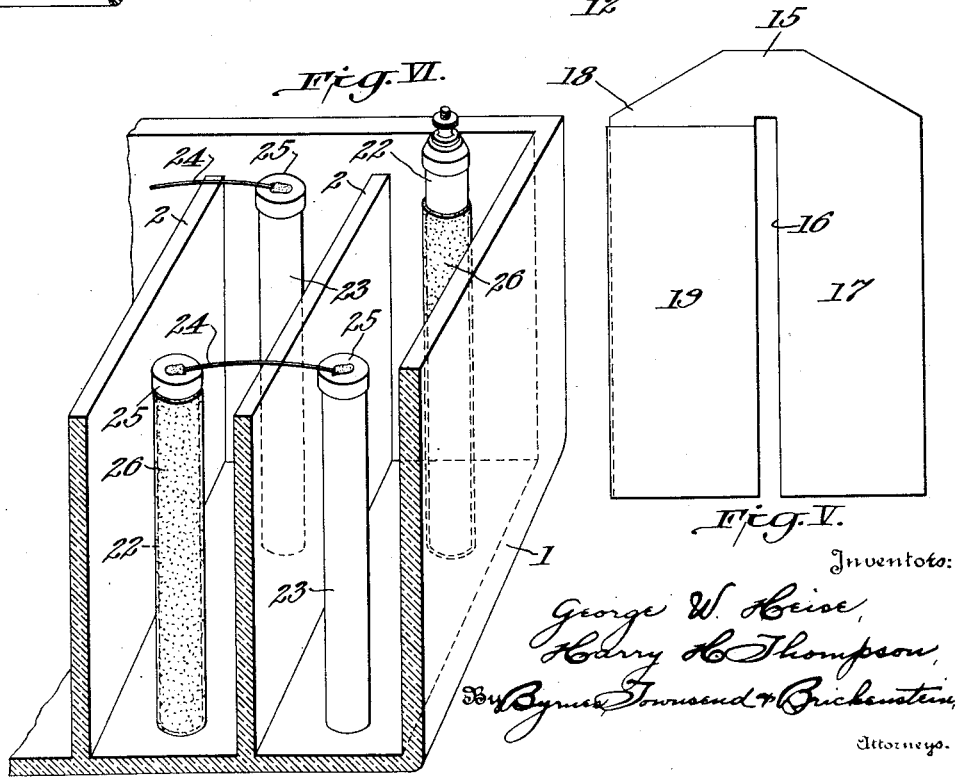

1,775,763

UNITED STATES PATENT OFFICE

GEORGE W. HEISE, OF BAYSIDE, NEW YORK, AND HARRY H. THOMPSON, OF CLEVELAND, OHIO, ASSIGNORS TO NATIONAL CARBON COMPANY, INC., A CORPORATION OF NEW YORK

DRY CELL AND ELECTRODE THEREFOR

Application filed December 31, 1923. Serial No. 683,749.

This invention relates to improvements in dry cells and has particular reference to batteries formed of such cells. The invention includes a unitary electrode structure adapted to span a partition wall between two adjacent cells, and to serve as anode in one cell and cathode in the other.

It has heretofore been proposed to use "duplex" electrodes, that is, electrodes which function both as anode and cathode. These are ordinarily sheet zinc coated on one side with a non-corrodible, conducting composition electro-negative to the metal. The exposed surface of the zinc is covered with a pasted pulpboard or the like, which is in contact with the mix of one cell. The conductive coating is in contact with the mix of an adjacent cell. In such prior constructions the cells must be packed in a battery box without compartments.

In many cases a compartmented box has important advantages, for example in facilitating assembly of the individual cell elements and replacement of parts. Leakage between the cells can not take place and the necessity for embedding the cells in pitch or the like is accordingly avoided.

A principal object of the present invention is to provide a compact, readily assembled battery in which each cell occupies a compartment of a suitable box and is connected with an adjacent cell through a folded or bifurcated duplex electrode.

Reference is to be made to the accompanying drawings, in which—

Fig. I is a perspective view of a preferred form of battery box;

Fig. II is a similar fragmentary view, on an enlarged scale, showing elements of the cells in position;

Fig. III is a perspective view of the form of electrode shown in the preceding figure;

Fig. IV is a view similar to Fig. II, but showing a modified electrode structure;

Fig. V is a front elevation of the bifurcated electrode of Fig. IV; and

Fig. VI is a view similar to Fig. II, showing the use of rod electrodes.

Referring to Figs. I, II, and III, numeral 1 denotes a box having partition walls 2 therein forming compartments 3. The compartments may be of any suitable number and shape, but there are preferably fifteen arranged as shown. A compact structure well suited for making "B" batteries is thus provided. The box 1 may be made of any desirable non-conducting material, such as water-proofed wood, hard rubber, glass, or the like. The box may advantageously be an integral casting. In some cases the compartments may be formed in a body of pitch or similar material, as by flowing pitch about removable dies of the proper shape.

Electrodes 4 in sheet form and having an elongated U-shape in cross-section are placed astride the partition walls 2. The electrodes generally comprise a sheet of metal, ordinarily zinc, bent along a median line to form parallel surfaces 5 and 6 of approximately equal size. The surfaces may extend the full width of the box, as shown, or may be of less breadth, especially when only small currents will be drawn from the battery. One of the surfaces, as 6, is covered on both sides with a conductive, non-corrodible composition 7. This may be a graphite-containing plastic adapted to harden upon the zinc.

The following coating composition is given by way of example:

170 parts rosin.
30 parts boiled linseed oil.
300 parts graphite (about 30 mesh fineness).
50 parts graphite (about 100 mesh fineness).

Further details with regard to the preparation of the conductive coating are given in the patent to C. S. Rider et al., No. 1,508,987, dated September 16, 1924. The present invention is not limited to any particular coating.

The terminal electrode 9 is a sheet of zinc having a lug 10. Connection to the external circuit may be made by means of soldering lead wires to the lug 10, or a binding post, spring clip, or the like, may be used. The other terminal electrode (not shown) is a plate of carbon, metal with a carbonaceous coating, or the like, arranged at the opposite end of the battery box.

The exposed zinc surfaces are prevented from direct contact with the depolarizing mix 11 by pasted pulpboard 12, or equivalent material. The mix will contain a proper amount of water and electrolyte salts. A sheet of pulpboard 13 may be placed upon the mix to support the plastic seal 14, which covers all the cell elements except the projecting portions of the terminal electrodes.

In the embodiment of the invention illustrated in Figs. IV and V, a modified form of duplex electrode 15 is used. This comprises a sheet of zinc having a longitudinal slot 16 adapted to receive a partition wall 2. One leg 17 of the slotted zinc sheet is left uncovered, the other (18) is coated on both sides with a conductive carbonaceous plastic 19 of the type previously described. The electrodes 15 are arranged at the ends of the compartments 3.

This arrangement is advantageous because it permits the use of electrodes of small zinc area. As described in our application Serial No. 601,882, filed November 18, 1922, and now matured into Patent No. 1,667,317, granted April 24, 1928, for the production of small currents, such as are required from "B" batteries or the like, only a small surface of zinc is necessary. The presence of a useless expanse of metal exposed to the electrolyte should be avoided because tending to shorten the life of the battery by corrosion on open circuit. Other advantages of the low zinc area are detailed in the application mentioned.

The terminal electrode 20 shown in Fig. IV is a sheet of zinc having a lug 21 adapted to receive suitable connecting means. A similar carbon electrode (not shown) is placed at the opposite end of the battery box.

As illustrated in Fig. VI, rod electrodes may be substituted for the duplex electrodes. In this figure, 22 denotes a zinc rod and 23 a carbon rod. Intercell connections may be made in any suitable way, as by attaching a wire 24 to a brass cap 25 on the carbon rod 23 and to the zinc electrode 22 of the adjacent cell, and so on throughout the series of cells.

The zincs 22 should be wrapped in pasted pulpboard 26, or the like. Or a paste layer may be formed around the rods. This may be conveniently done by placing in the cell a tube of somewhat greater diameter than a rod 22, tamping the mix about the tube, inserting a zinc rod centrally in the tube, and filling up the space between rod and tube with a suitable electrolytic paste. The tube may then be removed. Cast zinc, properly amalgamated, is preferable.

In a generally similar way, a paste layer may be provided on the plane zinc surfaces of the duplex electrodes previously described.

While the construction of Fig. VI has the advantages of low area zinc electrodes adjacent the ends of the cells, the assembly is not so simple as in the other forms of the invention, which are accordingly preferred.

In those forms (Figs. I to V) the duplex electrodes serve as anode and cathode for adjacent cells and as connecting means between them. Connection wires within the battery are eliminated and assembly greatly facilitated. The low resistance path between the cells afforded by the duplex electrodes materially reduces the internal battery resistance, as compared with wire-connected cells. This is not important in batteries for low drain work, but is of marked advantage in others.

The invention is not limited to the particular arrangement of cells shown. Any other suitable type of cell assembly may be adopted, for example the conventional "B" battery assembly of three rows of five cells each. Various other changes in the illustrative forms of the invention described herein may be made within the scope of the appended claims.

We claim:

1. A battery of dry cells, comprising a container having a wall forming compartments, depolarizing mix and electrolyte in the compartments, and a unitary electrode spanning said wall and comprising an exposed metallic surface and a surface coated with an impervious, conductive material electronegative to the metal, said surfaces forming respectively the anode and the cathode of adjacent cells.

2. The invention according to claim 1, in which the electrode comprises a bifurcated sheet of zinc, having a conductive carbonaceous coating upon one of the bifurcations.

3. A battery of dry cells, comprising a container having walls forming a series of parallel compartments, depolarizing mix and electrolyte in said compartments, a terminal electrode of opposite polarity in each end compartment, and intermediate electrodes, comprising strips of a single metal spanning the walls between the intermediate compartments, and each having a bare portion comprising an electropositive portion in one cell and a coated portion comprising an electronegative portion in an adjacent cell.

4. In a battery of dry cells separated by partition walls, electrode means adapted to connect the cells in series and comprising a unitary metallic member passing from one cell to another, said member having the surfaces of the portion positioned in one cell covered with a conductive, carbonaceous coating.

5. A battery of dry cells, comprising a compartmented container, depolarizing mix and electrolyte in the compartments, intermediate electrodes comprising a piece of metal having one end extending into the electrolyte of one compartment and the other end extending into the electrolyte of another compartment and coated with a conductive electronegative composition, and terminal electrodes for the battery.

6. A battery of dry cells, comprising a compartmented container, depolarizing mix and electrolyte in the compartments, intermediate electrodes comprising connected zinc sheets placed astride the compartment walls having one end extending into the electrolyte of one compartment and the other end extending into the electrolyte of another compartment and coated with a conductive electronegative composition, and terminal electrodes for the battery.

7. A battery of dry cells, comprising a compartmented container, depolarizing mix and electrolyte in the compartments, intermediate electrodes comprising bifurcated zinc sheets placed astride the compartment walls adjacent to the ends of the compartment walls having one end extending into the electrolyte of one compartment and the other end extending into the electrolyte of another compartment and coated with a conductive electronegative composition, and terminal electrodes for the battery.

8. A dry cell electrode comprising a bifurcated sheet of zinc having one leg covered with a coating of a conductive, electronegative composition.

9. A dry cell electrode comprising a sheet of zinc having a slot extending from one margin longitudinally of the sheet, one of the portions separated by the slot having a coating of a conductive, carbonaceous material.

10. In a dry battery, a plurality of cells each having a zinc plate electrode a portion of which is bent double, and a conducting paint entirely covering the bent-over portion of each plate and serving as the carbon electrode of the adjacent cell.

11. In a dry battery, a box, separators dividing said box into a plurality of compartments, a plurality of zinc electrodes each bent double and straddling a separator, a coating of conducting paint covering each electrode on one side of the separtors, a layer of porous absorbent material covering the free side of the electrode on the other side of the separators, and depolarizing mixture filling the space in each compartment.

In testimony whereof, I affix my signature.
GEORGE W. HEISE.
In testimony whereof, I affix my signature.
HARRY H. THOMPSON.